April 10, 1956   F. J. KROSLAK   2,741,046
PROTECTIVE VEHICLE LICENSE PLATE CASE
Filed July 14, 1953
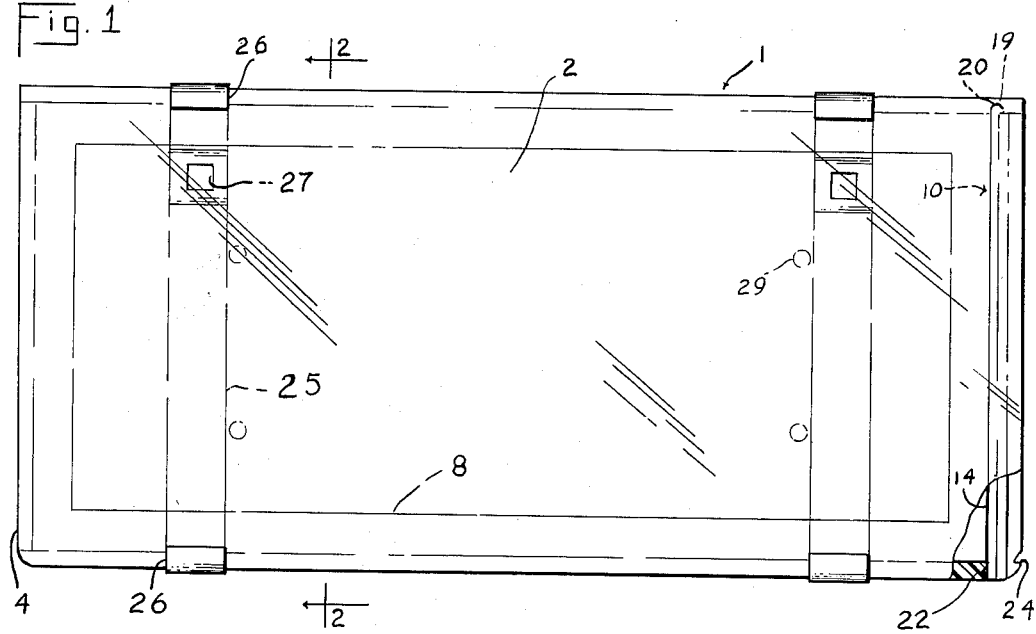
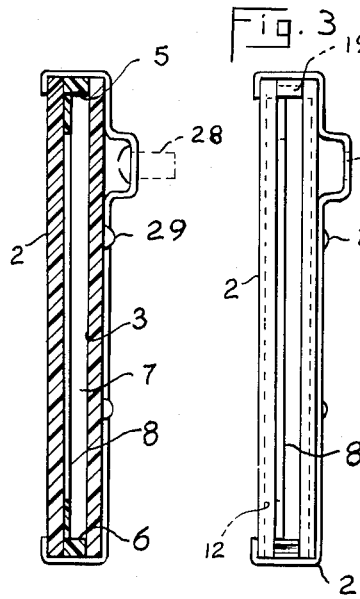
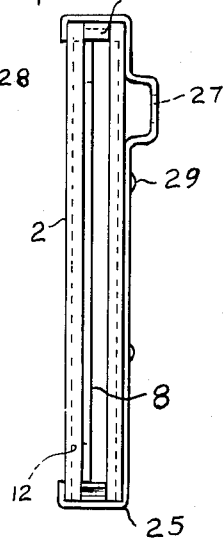
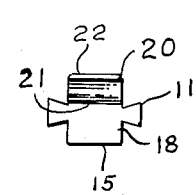
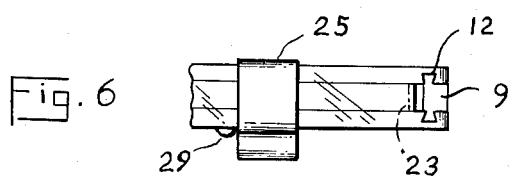
INVENTOR.
FRED J. KROSLAK
BY Nicholas J. Garofalo
ATTORNEY

United States Patent Office

2,741,046
Patented Apr. 10, 1956

2,741,046

PROTECTIVE VEHICLE LICENSE PLATE CASE

Fred J. Kroslak, Long Island City, N. Y.

Application July 14, 1953, Serial No. 367,798

1 Claim. (Cl. 40—125)

The invention relates to new and useful improvements in motor vehicle accessories. It is particularly concerned with an article having as its general object the preservation of vehicle license plates and their protection from the elements of the weather. At one time it was the custom in most States to annually issue new license plates to replace expired ones. This custom has proven costly and in many cases has been abandoned because of metal shortages. Now, instead of issuing new plates, small tags are annually issued instead to be added to the old plates. By this arrangement the old plates are used continuously for several years. But, through wear and tear and the elements of the weather, unprotected registration plates rapidly deteriorate in appearance as well as in the visibility of the characters printed thereon; and because of the considerable length of time during which the plates will be in use it is desired that some means be provided to preserve their original condition.

Now, I have devised a means for protecting registration plates against the elements of the weather, as well as from wear and tear. My invention comprises a case of transparent material in which a license plate may be confined and sealed against attacks by the weather and safeguarded against undue wear and tear.

A feature of the invention lies in the transparent nature of the material forming the case, which not only permits clear visibility of the license plate, but also serves to protect the plate against deterioration.

A further feature of the invention is associated with one side of the casing having an opening to permit insertion of a plate in the case. This opening is provided with a simple closure element so designed as to permit manual opening and sealing of the case. The closure has many advantages, principally because it seals the opening of the case against entrance of water, dust and the elements of the weather.

Another feature of the invention is simple and practical means permitting the attachment of the device to a vehicle support.

A further feature of the invention is a fluorescent insert adapted to be received in the case so as to frame the license plates. This feature not only adds to the attractiveness of the article but also provides various benefits by virtue of the light it provides, particularly at night.

An object of the invention is, therefore, the provision of a practical case for the preservation and protection of a vehicle license plate;

Another object of the invention is the provision of a practical case for the preservation and protection of a vehicle license plate;

Another object of the invention is the provision of a transparent license plate holding case, which is impervious to the elements of the weather and adapted to be secured to a vehicle in a practical manner; and A further object of the invention is novel and improved closure means for sealing the opening of a license plate holding case.

The invention further lies in the novel arrangement, and construction of the various elements of the case as well as in their particular relation to one another.

The foregoing features, objects and advantages of the invention, as well as others, will become readily apparent as this specification unfolds in greater detail and as it is read in conjunction with the accompanying drawings.

In the drawings, wherein a license plate holding case embodying my invention is illustrated, Fig. 1 is a front elevation view of the case;

Fig. 2 is a section on line 2—2 of Fig. 1;

Fig. 3 is an elevation view of the open end with the closure element removed; and Fig. 4 is a detail of the closure element;

Fig. 5 is an enlarged top plan view of the closure element; and

Fig. 6 is a bottom plan view of the right end.

In describing the invention in further detail, reference is directed to the several drawings, wherein there is disclosed a case 1 formed of transparent material, preferably colorless vinylite plastic. It includes a front and a rear wall 2, 3 in spaced parallel relation to one another and connected together by an end wall 4 and top and bottom walls 5, 6. The space 7 separating the front and rear walls is slightly wider than the thickness of a conventional vehicle license plate, and it is designed to freely accommodate a license plate as well as a frame insert 8 of thin fluorescent plastic material described later herein. The several walls of the case are preferably integral with one another. The remaining end of the case at 9 is open. The opening 9 serves as a means to enable insertion into the case of a license plate as well as the insert frame 8.

A suitable closure element 10 is provided to seal the opening 9 and to confine the insert 8 and the license plate within the case. The closure 10 is so constructed and arranged in the opening as to seal the case against the entrance of water or moisture, dust, or the elements of the weather. The closure 10 is an elongated element vertically slidable between the marginal ends of the front and rear walls, and it is adapted to open or close the opening. To this end, the closure element 10 is provided longitudinally thereof on opposite sides with dovetail tongues 11 engageable and slideable in complementary dovetail sockets 12 in the marginal portions of opposite faces of the front and rear walls. Further, the element 10 is substantially Maltese cruciform in cross section, as indicated in Fig. 5. While the tongues 11 are arranged to dovetail into the wall sockets 12, a tongue 14 longitudinally of the inner face of the element 10 is formed to fit between and to lightly abut front and rear walls in the inner side of the case opening. Another tongue 15, formed on the element 10 opposite to that of tongue 14, is arranged to fit between a marginal end portion of the inner faces of the front and rear walls and in such manner that its outside surface 16 is flush with the end edges of the front and rear walls.

The closure element 10 is vertically slideable between the walls 2 and 3 and its upper end includes a shoulder 18 which is adapted to abut against the underside of the top connecting wall 5. The wall 5 is of thickened proportions and includes in its underside a keeper slot 19 extending the width thereof and into which a keeper or cam lip 20 on the upper end of the element 10 engages when the element 10 is in fully closed position.

It is noted that the sockets 12 begin at the underside of the top wall 5 and continue down the inner faces of the front and rear walls and out to the bottom edges thereof. By this arrangement the closure 10 may be entirely removed from the case by sliding it down and out of the sockets. In closing the opening the upper ends of the dovetail tongues are inserted from the bottom of the case into the sockets 12, the closure is then slid vertically upwards, closing the case as it is moved upwards.

It is moved upwards until the lip 20 thereon engages fully in the keeper slot 19. The lip 20 has a slight cam 21, so that when the lip is pressed into the complementary slot 19, it will be cammed and held therein. The lip 20 is of a width preferably equal to that of the space separating the front and rear walls. This arrangement serves to effectively prevent the entrance of moisture, dust or other foreign particles into the case at this juncture. It also seems to prevent the closure element from slipping loose and partially opening the closure.

The dovetail tongue and slot arrangement at the sides of the closure effectively seals the opening against entrance of moisture, dust, and foreign particles along the length of the closure.

To further secure the closure in its closed position so as to prevent it from slipping or jarring loose, an added latching feature is provided near the bottom end thereof. This feature includes a bead or cam 22 engageable in a complementary dimple 23 in the end face of the bottom wall. By this arrangement when the closure is in fully closed position the bead 22 will be cammed into the dimple and will not only secure the closure in position at its bottom end, but will also effectively seal this end of the case aaginst the entrance of moisture, and other matter.

From the foregoing, it is quite plain that the case will be effectively sealed and its contents well protected against attack by water, moisture, dust and other elements.

To facilitate removal of the closure 10, there is provided in its outer face a grip notch 24 in which a thumb, nail or the end of a flat tool may be engaged and, by pressing downward the closure may be loosed of its upper and lower latches and slid down and out from between the front and rear walls.

The case is attachable to the support of a vehicle by suitable means. Here, this means is in the form of a pair of clamps 25, the ends of which are bent over to form a pair of opposing channels 26 into which the top and bottom edges of the case may be slid. There is a clamp 25 provided for each end of the case. The clamps include centrally thereof a slightly bent out portion having a square opening 27 in which is adapted to be received the square shank end of a bolt 28. The bolt is adapted to be held by a nut to a suitable support of a vehicle.

The case is theft-proof. When the clamps 25 are bolted to a vehicle the case may not be slid out of the clamps because of slight projections 29 on the outer face of the rear wall. When the case is forced to move in either direction, it will be prevented from a full movement by means of the projections 29 limiting against the sides of the clamps, the clamps being firmly bolted to the vehicle.

Another feature of the invention is the insert 8. This is in the form of a thin flat frame preferably of fluorescent plastic material. It is inserted through the end opening of the case and is positioned in front of the license plate. The proportions of the frame rails are such as to provide a border of frame about the marginal edge of the plate. The fluorescent nature of the frame material serves not only to dress up the appearance of the case since it is of another color, but it also adds to the visibility of the plate, particularly at night.

While I have described and illustrated a preferred form of my invention, it is my intent, however, to claim the invention not only as described but also in all such forms and modifications thereof as may be reasonably construed to be within the spirit and scope of the Letters Patent and the appended claim.

I claim:

In apparatus, including a transparent plastic case comprising front and rear walls joined together in close parallel relationship, having an open end through which a license plate may be received, and characterized by a projection integrally formed on the outer face of the rear wall of the case at a measured distance in from one end of the case, and by a second projection integrally formed on the outer face of the rear wall of the case at a measured distance in from the opposite end of the case; a bracket comprising a vertically disposed strap piece terminating at its ends in a pair of opposed narrow channels in which one end of the case is slidably receivable until limited by abutment of the related end projection with an inner edge of the strap; a second bracket similar to the first mentioned bracket, in the end channels of which the opposite end of the case is slidably receivable until limited by abutment of the related end projection with an inner edge of the strap of this second bracket; and a rearwardly extending offset in each strap providing a well to accommodate the head of a bolt passed through an aperture in the strap for fastening the bracket to a vehicle support.

References Cited in the file of this patent

UNITED STATES PATENTS

| | | |
|---|---|---|
| 1,367,659 | Hollis | Feb. 8, 1921 |
| 2,135,191 | McBrady | Nov. 1, 1938 |
| 2,180,229 | Frakes | Nov. 14, 1939 |
| 2,515,820 | Clark | July 18, 1950 |
| 2,531,737 | Lyon | Nov. 28, 1950 |
| 2,535,265 | Caffrey | Dec. 26, 1950 |
| 2,540,221 | Ten Hoeve | Feb. 6, 1951 |
| 2,659,991 | Strayer | Nov. 24, 1953 |